United States Patent [19]

Brown et al.

[11] Patent Number: 4,617,182
[45] Date of Patent: Oct. 14, 1986

[54] CASCADE HEAT RECOVERY WITH COPRODUCT GAS PRODUCTION

[75] Inventors: William R. Brown, Zionsville; Anthony A. Cassano, Allentown; Brian R. Dunbobbin, Allentown; Pradip Rao, Allentown, all of Pa.; Donald C. Erickson, Annapolis, Md.

[73] Assignee: Air Products and Chemicals, Inc., Allentown, Pa.

[21] Appl. No.: 769,230

[22] Filed: Aug. 26, 1985

[51] Int. Cl.[4] .............................................. C01B 13/04
[52] U.S. Cl. .................................... 423/579; 75/42; 75/59.14; 208/113; 423/210.5; 423/219; 502/41
[58] Field of Search ...................... 423/579, 210.5, 219, 423/351; 75/42, 59.14; 208/113; 502/41

[56] References Cited

U.S. PATENT DOCUMENTS

| | | | |
|---|---|---|---|
| 819,127 | 5/1906 | Doherty | 432/1 |
| 3,310,381 | 3/1967 | Guerrieri | 423/579 |
| 3,870,462 | 3/1975 | Semenov et al. | 432/136 |
| 4,132,766 | 1/1979 | Erickson | 423/579 |
| 4,224,045 | 9/1980 | Oiszewski et al. | 62/30 |
| 4,287,170 | 9/1981 | Erickson | 423/579 |
| 4,340,578 | 7/1982 | Erickson | 423/579 |
| 4,382,366 | 5/1983 | Gaumer | 62/31 |

Primary Examiner—John Doll
Assistant Examiner—Wayne A. Langel
Attorney, Agent, or Firm—Geoffrey L. Chase; E. Eugene Innis; James C. Simmons

[57] ABSTRACT

A process for the integration of a chemical absorption separation of oxygen and nitrogen from air with a combustion process is set forth wherein excess temperature availability from the combustion process is more effectively utilized to desorb oxygen product from the absorbent and then the sensible heat and absorption reaction heat is further utilized to produce a high temperature process stream. The oxygen may be utilized to enrich the combustion process wherein the high temperature heat for desorption is conducted in a heat exchange preferably performed with a pressure differential of less than 10 atmospheres which provides considerable flexibility in the heat exchange.

23 Claims, 4 Drawing Figures

CASCADE HEAT RECOVERY WITH COPRODUCT GAS PRODUCTION

The government of the United States of America has rights in this invention pursuant to Contract No. DE-AC07-82CE40544 awarded by the U.S. Department of Energy.

TECHNICAL FIELD

The present invention is directed to the production of oxygen and nitrogen wherein a unique cascade efficient heat recovery is achieved. More specifically, the present invention is directed to the production of oxygen, nitrogen and the recovery of high temperature heat, wherein excess temperature availability from a combustion process is more effectively utilized for the reversible liquid phase reaction for separation of oxygen and nitrogen from air.

BACKGROUND OF THE PRIOR ART

It is known in the prior art to separate oxygen from air using a molten stream of an oxygen acceptor comprising a liquid containing alkali metal nitrite and nitrate salts. This fundamental chemical air separation is set forth in U.S. Pat. No. 4,132,766. At least some energy of compression of the air feed to such a separatory process is recovered by the expansion of oxygen depleted gas from the separatory process.

The coproduction of oxygen and nitrogen as relatively pure products of a chemical separation utilizing the alkali metal salts of nitrite and nitrate materials is also known. In U.S. Pat. No. 4,287,170, air is contacted sequentially with such alkali metal salts, and then residual oxygen is scavenged from the oxygen depleted effluent with an absorption media, such as manganese oxide. At least some energy of compression for the feed air is recovered by expanding the nitrogen product to a lower pressure.

This prior art (U.S. Pat. Nos. 4,132,766 and 4,287,170) is not uniquely integrated by heat exchange with a combustion process to co-produce a high temperature process stream, oxygen and nitrogen.

U.S. Pat. No. 4,340,578 discloses a method for producing oxygen with a chemical absorbent solution of molten alkali metal nitrite and nitrate salts wherein the salt solution contains additional oxides in low concentration, and the oxygen depleted effluent from the chemical separation is combusted with fuel and expanded to recover power in two stages. The combustion effluent is heat exchanged with the air feed and the oxygen product to elevate the air feed to absorption conditions. The molten salt absorbent solution is depressurized to release the reversibly contained oxygen therefrom and provide an oxygen product.

It is also known to separate oxygen from air using cryogenically low temperatures and subsequently to combust the waste nitrogen along with a portion of the air feed to the cryogenic separation with expansion of the combustion effluent to recover power for the process. Such a process is set forth in U.S. Pat. No. 4,224,045.

The net generation of power and the production of oxygen has also been disclosed in U.S. Pat. No. 4,382,366 wherein air is compressed and separated in a cryogenic low temperature distillation column. The waste nitrogen is combusted with fuel and expanded through a turbine to recover power for the compression of feed air to the cryogenic separation, as well as to pressurize oxygen product and to generate power. The combustion effluent may also be utilized to raise steam to enhance power generation.

The prior art (U.S. Pat. Nos. 4,340,578; 4,224,045; 4,382,366) provides for energy recovery from an air separation process by combusting the waste nitrogen directly with fuel followed by expansion of the combustion effluent to recover power.

The net generation of power by the recovery of heat from a low pressure combustion process by heat exchange to produce a high temperature pressurized process stream, and subsequently recovering power from the process stream by expansion in a power recovery turbine is exemplified by the well known Rankine cycle. Steam is the preferred working fluid. For efficient high temperature recovery of heat, higher steam pressure, about 400 psia to 2500 psia, is needed in order to provide the maximum power recovery in the isentropic expansion stage of the Rankine cycle. The metallurgical strength limit of the heat exchangers metal tubes becomes a problem since a high wall temperature tube cannot withstand the high pressures. Efficient steam generation heat recovery from atmospheric pressure combustion gases uses pressure differentials across the heat exchanger metal tubes in the range of 20 to 170 atmospheres.

U.S. Pat. No. 3,310,381 discloses the recovery of oxygen from air using a suspension of solid absorbent in a liquid carrier in a cocurrent contact of air and absorbent. Temperatures above 932° F. are recited for the system which uses barium oxide and barium peroxide.

The patent process is a continuous version of the Brin process using a pressure and temperature swing cycle. Feed air cocurrently contacts the barium oxide/barium peroxide suspension in an absorber which heat exchanges with an external heat exchange fluid. The absorber operates at approximately 1112° F. and a pressure slightly above atmospheric pressure. The oxidized acceptor is further heated to approximately 1472° F. in a heater. The high temperature oxidized acceptor is reduced in pressure and desorbs oxygen with attendant reduction in temperature to 1328° F. The partial pressure of the oxygen in the acceptor is determined by temperature because the barium oxide and barium peroxide are always present in the suspension of acceptor.

BRIEF SUMMARY OF THE INVENTION

The present invention is directed to a method for separating oxygen from air by a reversible chemical absorption and desorption at high temperature and the recovery of heat from a combustion process by integrating the air separation in cascade heat exchange with the combustion process to produce oxygen and rejecting heat at a temperature of at least 700° F. comprising the steps of, compressing air to an elevated temperature and pressure, contacting at least a portion of the air, which has been preliminarily cleaned and dried, with a liquid chemical absorbent whose oxygen release occurs at a temperature approximate the heat of the combustion process to chemically absorb at least a portion of the oxygen from said air, heating the oxidized liquid chemical absorbent to a temperature of at least 900° F. by heat exchange of the absorbent with a combustion process that produces high quality heat at or above 1000° F. to transfer such high quality heat from the combustion process to the liquid chemical absorbent, desorbing oxygen from said absorbent utilizing said high temperature heat to produce an oxygen product and to regenerate the absorbent cooling the regenerated absorbent by heat exchange with a process stream to reject heat from the absorbent at a lower temperature level than the previous heat exchange at a temperature of at least 700° F. and produce a high temperature process stream, recycling the absorbent for further contact with air, preferably recovering heat and/or power from the high temperature process stream, and utilizing the oxygen product to enrich the combustion process of the overall method.

More preferably, the compressed air is split into an air stream fed to the combustion process and an air stream fed to the separation process.

Preferably, the absorbent is heated to a temperature of approximately 1200°–1400° F. to desorb oxygen and regenerate the absorbent, optimally approximately 1350° F.

The combustion process may comprise a combustion steam boiler, a partial oxidation gasifier, a Claus sulfur plant, a steam methane reformer, an ethylene plant, a catalytic cracker regenerator, an ammonia oxidation reactor or a fluidized bed combuster.

Preferably the oxidized liquid chemical absorbent is pumped to an elevated pressure before desorption to produce a resulting high pressure oxygen gas product upon desorption.

Preferably the heat exchange between the combustion process and the liquid chemical absorbent is performed at a pressure differential of 10 atmospheres or less.

DETAILED DESCRIPTION OF THE INVENTION

Figure 1:
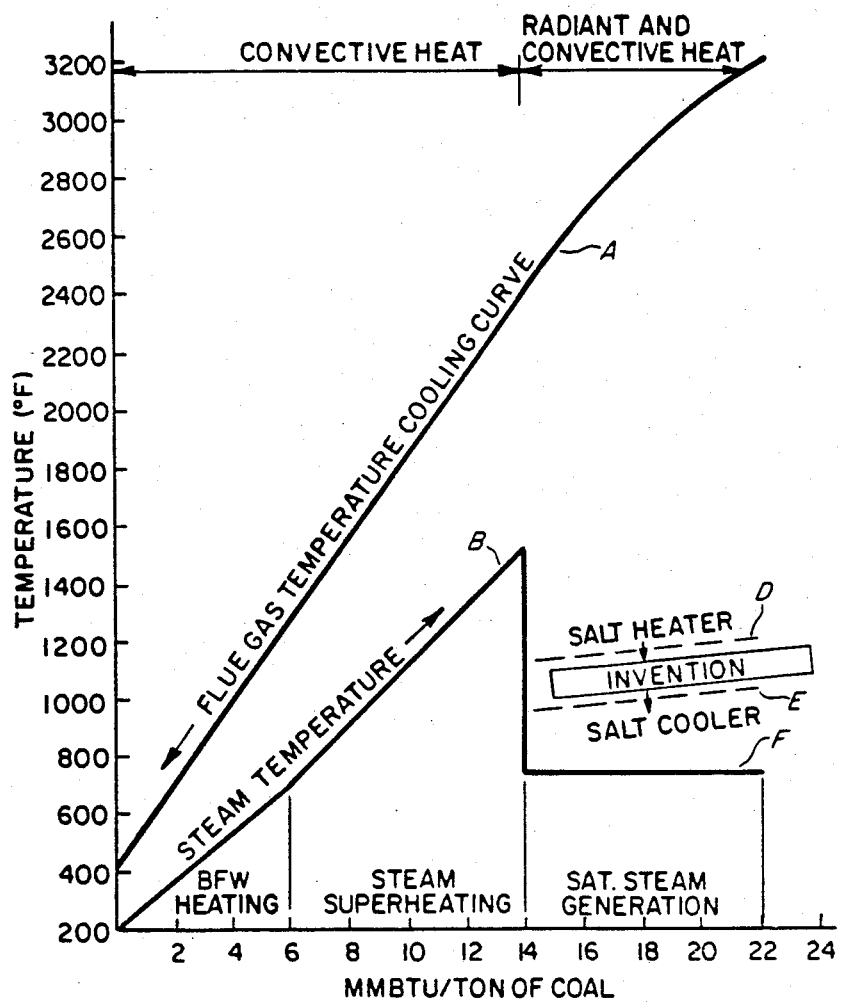
FIG. 1 is a graph of cooling curves for a combustion process (steam generation) and the oxygen separation process of the present invention.

The prior art fails to provide the energy savings of the present invention, which uniquely integrates by heat exchange a combustion stage with a chemical reaction which produces oxygen and potentially nitrogen; and allows the subsequent recovery of energy from the reversal of the chemical reaction. The present invention overcomes another drawback of the prior art, which allows the production of only a single combustion-free product. The present invention provides a process that produces potentially power, oxygen product and potentially combustion-free nitrogen, while efficiently utilizing high temperature heat in a cascade manner to produce the oxygen and, potentially, steam for the production of power in a sequential arrangement of such heat utilization.

The prior art is unable to utilize the high temperature levels initially produced by the combustion process due to limitations in absorption of the heat by the heat utilizing processes and limitations of materials in the heat exchangers. The present invention overcomes these limitations by providing a large sensible heat recovery in a liquid chemical absorbent and an endothermic reaction heat evolving the oxygen product which effectively uses heat at the high temperatures produced by the combustion process. The operating pressure of the highest temperature portion of the combustion heat recovery exchanger is preferably selected within 10 atmospheres of the combustion process pressure, thereby minimizing structural strength requirements for the heat exchange device, and allowing selection of higher corrosion, lower stress resistant materials of construction, such as ceramics or low strength metals.

The present invention integrates a chemical absorption separation of oxygen from air in a high temperature heat exchange wherein the excess temperature availability from a combustion process is utilized to assist in oxygen and nitrogen separation from air, while the heat is then recovered from the chemical absorption separation process at temperature levels more appropriate for conventional heating, drying, steam generation or power recovery use. In addition, the oxygen produced in the separatory process may be utilized to enrich the combustion process. The heat exchange between a high temperature heat source and the chemical absorbent molten salt allows for pressure differentials of less than 10 atmospheres in comparison to the 20 to 170 atmospheres of pressure differential of the prior art.

The method of the present invention relies upon the unique features of the chemical absorbent; for example the alkali metal nitrite and nitrate salts, which are used in the molten state to selectively absorb oxygen from air at elevated temperature and atmospheric to elevated pressure in multistage counter current contact, leaving an essentially nitrogen-containing product wherein the nitrite is oxidized to the nitrate and the nitrate is then further heated to release the oxygen and regenerate the nitrite species of the absorbent. Other liquid chemical oxygen selective absorbents include either BaO, $Na_2O_2$ or $K_2O_2$ in a molten salt bath of sodium, lithium or potassium nitrate, an alkali metal hydroxide or sodium carbonate. In the context of the present method, the desorption of oxygen from the oxidized absorbent is achieved by increasing the temperature of the oxidized absorbent to a sufficiently high temperature at the desorber pressure so as to drive the oxygen from the alkali metal nitrate portion of the absorbent. This desorption occurs in the temperature range of 900° F. to 1600° F. (high quality heat) and is preferably performed at a temperature of approximately 1200°–1400° F., optimally approximately 1350° F. It is then necessary to cool the absorbent down to a lower temperature in the range of 700° F. to 1000° F. (lower quality heat), preferably approximately 900° F. in a second cascade heat exchange with a process stream for the regenerated absorbent to be capable of absorbing oxygen selectively from air in a continuous cyclic process. This type of absorption is referred to as temperature swing absorption, wherein a change or fluctuation in temperature between the absorption and desorption conditions effects the respective absorption of oxygen on the nitrite and the desorption of oxygen from the nitrate. The advantage of using temperature swing absorption is that the pressure level at different points may be independently selected at desired levels. For example: the gaseous oxygen absorption pressure may be selected for the optimum N₂ product pressure; the heat exchanger may be at a higher (pumped) or lower pressure selected to minimize the pressure differential between the heat source and the absorbent; and the desorber pressure may be at a different pressure than the heat exchanger to optimize the oxygen pressure of the desorption reaction for lower salt pumping rates, lower temperatures, or to minimize oxygen compression. The gas being selectively absorbed and recovered is recovered at any desired pressure level and also may be absorbed at various pressure levels. This ability to operate the present invention process at any pressure gives a significant advantage in the selection of materials of construction in the tubes of the combustor/boiler (heat exchanger). In a traditional combustor/boiler (heat exchanger) the tube wall temperature is limited to less than about 1500° F., usually 1200° F., due to metallurgical constraints of the metal alloys used. The tubes have to withstand steam pressures of between 400 and 2500 psia. In this process, the inventors have replaced the high pressure heat receiving stream with the liquid chemical oxygen absorbent which can perform its oxygen desorption at any reasonable pressure. By selecting the liquid chemical absorbent pressure near that pressure in the combustor/boiler, a minimal pressure differential can be obtained across the absorbent heater tube wall, preferably less than 10 atmospheres. This then allows the use of metal alloys at higher tube wall temperatures (since the allowable working temperature of an alloy is dependant on the pressure differential across the tube wall) or allows the use of corrosion resistant materials such as ceramics, high nickel alloy steels and high density fused alumina and zirconia, which can withstand high temperatures, but not high pressure differentials. For example, in a low pressure combustion system, such as a blast furnace off-gas boiler, a low pressure salt loop desorber pressure could be employed. In a high pressure combustion system, such as a gasifier, a high pressure salt loop desorber pressure could be used. This invention allows the freedom to select absorber, heat exchanger and desorber pressures independently of one another.

In one embodiment of the present invention, the elevated pressure of the oxygen product is uniquely achieved after absorption of gaseous oxygen from air into the alkali metal nitrite and nitrate contained in the molten salt of the absorbent solution. In the liquid phase, it is energy efficient to pump the absorbent after its oxidation to the appropriate elevated pressure before desorbing under high temperature conditions to recover high pressure oxygen gas. This method avoids the energy input necessary in prior art practices for recovering high pressure oxygen using gas compression technology. This separation technique is performed in a manner contrary to the general recitations in the prior art. Prior art temperature swing and pressure swing technology generally uses low temperature and/or high pressure for absorption and high temperature and/or low pressure for desorption. This embodiment of the present separatory process uses a combination of elevated temperature and elevated pressure to desorb oxygen, but provides a high pressure oxygen product.

The combustion process stage of the present invention includes any of a number of combustion processes which provide high quality heat in the range of 1000° F. to 3500° F. and which recover heat by heat exchange to produce a high temperature process stream in the range of 325° F. to 1000° F., which may be used directly or subsequently recovered as power. Such combustion processes are typically utilized to generate power. Even in the case of such combustion processes wherein the combustion itself is the desired result and power production is a by-product, the present invention more effectively utilizes the heat of the combustion process. Such combustion processes include combustion steam boilers, partial oxidation gasifiers, Claus sulfur plants, steam methane reformers, ethylene plants, catalytic cracker regenerators, ammonia plant oxidation reactors, and fluidized bed combustors. Associated with such steam boiler combustion processes are integrated processes such as blast furnaces and basic oxygen furnaces for the production of steel. Some of these processes are directly related to the production of power, while other processes produce primary products such as regenerated catalyst or iron metal. In the latter case, the power generation may be a by-product conducted to maintain efficiencies of the overall operation. However, in either case where the combustion process is primarily to produce a specific product or to directly produce power, a common attribute of such combustion processes is the inability to utilize the produced heat at the high temperature levels initially produced by the combustion process in a radiant and convective zone of the combustion process due to the limitations in the absorption of the heat by heat utilizing processes and the limitations on materials in present state of the art heat exchangers.

With reference to FIG. 1, the unique capabilities of the present integrated method can be illustrated. The graphs in FIG. 1 show the various cooling curves associated with a high pressure coal fired steam boiler. Line A shows the cooling curve for the flue gas from the combustion zone of the steam boiler. Line B and F show the heating curve for the production of steam. It can be seen that a significant inefficiency exists between the cooling curve of the flue gas A and the heating curve of the steam preparation B and F. In addition, at temperatures above 1400° F. the high temperature heat of the combustion flue gas cannot be utilized due to the restraints on heat exchange and heat exchange materials. Therefore, saturated steam generation at a ower temperature must be resorted to with increased inefficiency demonstrated by the vertical distance between the respective curves A and F. Such a discrepancy between the cooling/heating curve lines constituting an inefficiency in heat utilization can uniquely be overcome by the integrated method of the present invention wherein a chemical oxygen absorbent can be reversibly operated in the temperature range of 700° F. to 1600° F. This chemical separation of oxygen and nitrogen from air in the temperature swing mode described above absorbs heat from the combustion process flue gas along the heating curve line D to regenerate oxidized chemical absorbent and produce an oxygen product and then rejects the heat after oxygen removal to cool the absorbent to temperatures where it can reabsorb additional oxygen along the cooling curve line E. As shown in FIG. 1, this unique air separation technique fits in an area of high temperature heat exchange which previously presented a loss of energy due to inefficiency in heat exchange. In addition, the close separation between the respective cooling/heating curves D and E of the chemical air separation absorption process illustrates that high quality heat, previously unutilizable, can be utilized to produce an oxygen and nitrogen product and then rejected at near temperature or quality levels and used in the production of high temperature process streams, such as steam for utilization in the production of power. The result of this integrated method is that a combustion process may be combined with an air separatory process to provide a unique utilization of high temperature, high quality heat wherein the heat may still be rejected for traditional duty in the generation of power or the production of high pressure process streams, as shown by the fact that salt cooling curve E lies substantially above curve F for the generation of saturated steam. The further integration of the use of the oxygen product of the separatory process for enrichment in the combustion process adds an additional level of integration and overall process efficiency.

More specifically with reference to FIG. 1 which describes the cooling and heating curves for a typical boiler, the flue gas from such boiler decreases in temperature from about 3200° F. in the radiant and convective section of the boiler to 400° F. in the convective-only section of the boiler. Boiler feed water preheating and steam superheating take place in this convective section of the boiler. The limitation of low wall temperatures for heat exchangers due to materials limitations between the cooling flue gas and the warming steam producing media in the present state of the art for such exchangers provides a unique window for the use of the chemical alkali metal nitrate and nitrite salt absorbent integrated oxygen and nitrogen production of the present invention. In a conventional steam generating boiler, the heat is absorbed into water/steam as a combination of sensible heat (to raise the temperature) and latent heat (to vaporize the water). This provides a large heat removal capacity over just sensible heat removal alone. Similarly, the chemical absorbent, e.g. the molten solution of alkali metal nitrite and nitrate salt, has a high heat removal capacity. However in the present invention, this capacity is large because of both sensible heat (to raise the salt temperature) and reaction heat (to drive the $NO_3^- \rightarrow NO_2^- + \frac{1}{2}O_2$ reaction evolving oxygen). This integrated oxygen and nitrogen production requires heat at about 1100° F. or above which is the appropriate heat available in the radiant and convective section of a boiler. This approximately 1100° F. heat is used to drive the endothermic reaction of the chemical absorbent: e.g. $NO_3^- \rightarrow NO_2^- + \frac{1}{2}O_2$, to generate oxygen from the previously oxidized chemical absorbent. Reversal of the above reaction is exothermic and so continuous absorption of oxygen from air selectively by the chemical absorbent allows heat to be rejected to a bottoming cycle, such as the generation of steam for process purposes or to produce power through a turbine.

The principle illustrated in the graphs of cooling and heating curves in FIG. 1 is that prior to the present integrated method in the operation of a steam boiler, metallurgical constraints limited the wall temperatures in the boiler tubes.

Therefore, the most efficient utilization of the high quality radiant heat, which would be obtained by heating the hottest heat accepting stream by the hottest heat supplying stream, could not be obtained economically by steam generation alone in such a boiler. The present invention utilizing a chemical absorption of oxygen from air to provide oxygen and nitrogen in an integrated manner with such a combustion/steam generation process provides such an efficient heat utilization at high temperature levels where the quality of the heat was previously unutilizable. The integrated method also provides an oxygen product and a nitrogen product resulting from such heat utilization and the ability to reject the heat at near input quality and quantity levels for further utilization in traditional steam generation or process stream heating.

The integrated method of the present invention will now be described in greater detail with reference to three preferred embodiments of the invention.

Figure 2:
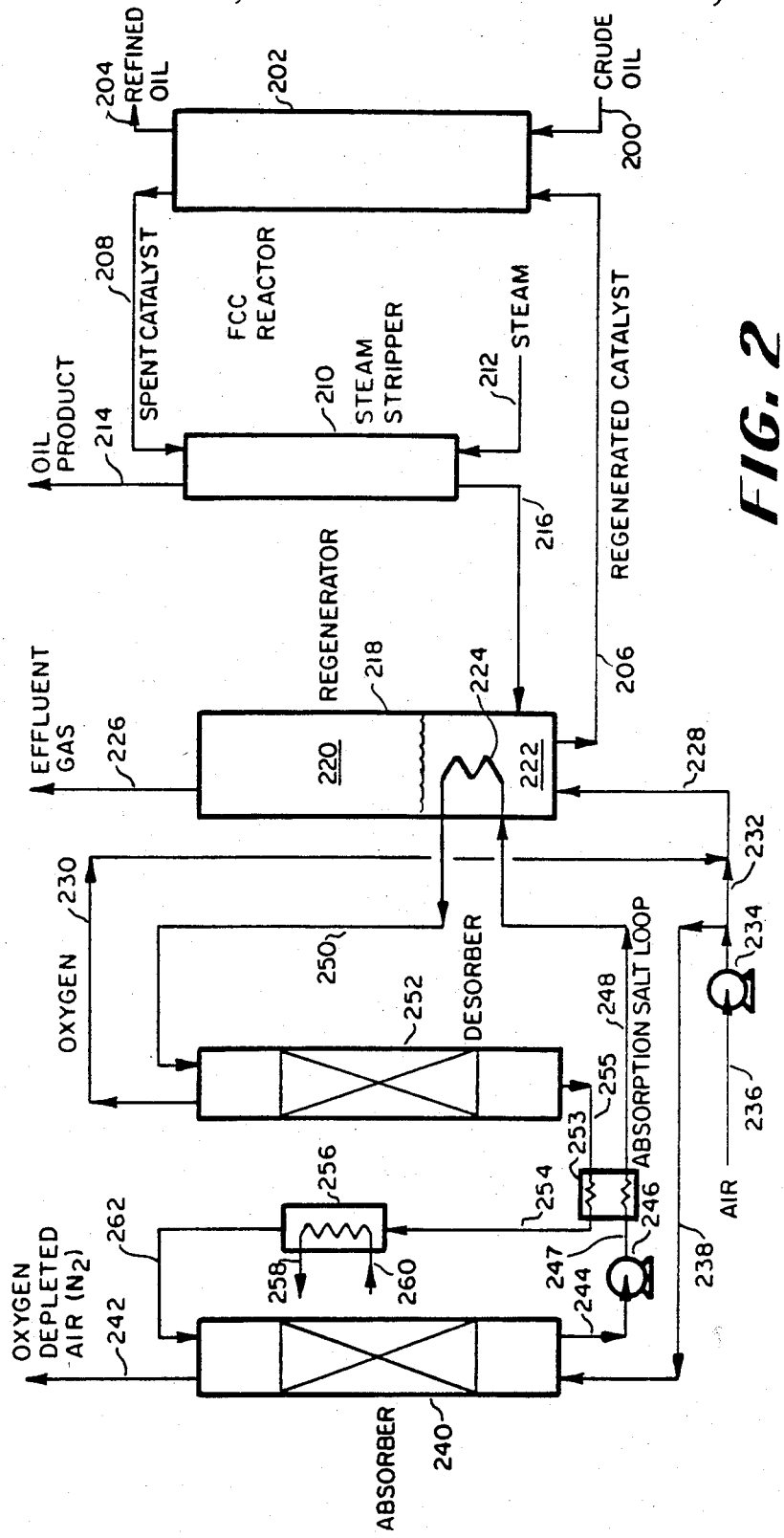
FIG. 2 is a preferred embodiment of the present invention wherein the oxygen separation process is integrated with a fluidized catalytic cracker regenerator.

In FIG. 2 an integrated method is set forth for the utilization of heat from a fluidized catalytic cracker regenerator in the chemical absorptive separation of air using an alkali metal salt solution of nitrate and nitrite. Although the chemical absorbent solution has been described as being alkali metal combinations of nitrate and nitrite, it is understood that additional adjuvents can be added to provide optimal performance in oxygen selectivity and continuous low corrosion operation of the separation process. In this regard the nitrate and nitrite can be mixed with various peroxides and superoxides to provide a composite oxygen absorbent such as is described in U.S. Pat. No. 4,340,578 hereby incorporated herein by reference. Additionally, it may be beneficial to use oxide concentrations below the 2% level recited in that patent such as disclosed in U.S. Pat. No. 4,529,577, also incorporated herein by reference.

As shown in FIG. 2, a traditional fluidized catalytic cracker and regenerator are operated wherein a crude oil or gas oil to be cracked to potentially gasoline or refined oil products is introduced in line 200 into a fluidized catalytic cracker reactor 202. A bed of appropriate catalyst, as is well known in the prior art, contacts the oil at elevated temperature and pressure to induce cracking, wherein an appropriate lower molecular weight hydrocarbon product, such as gasoline, is removed in line 204. During the course of continuous cracking of oil on the catalyst, coking of that catalyst occurs, which effectively deactivates the catalyst. Deactivated or spent catalyst is continuously withdrawn in line 208 from the reactor 202 and introduced into a steam stripper 210 which recovers residual product by scrubbing with steam introduced in line 212 and carrying a product in line 214 overhead from the stripper 210. The spent catalyst is then removed in line 216 for regeneration by the combustion of the coke contained on the catalyst by a high temperature fluidized combustion process. This regeneration is performed in the fluidized regenerator 218 which is charged with compressed air, preferably oxygen enriched air, introduced in line 228. The highest combustion temperatures occur in the fluidized bed 222. Gaseous combustion effluents are removed in line 226. Particularly under oxygen enriched operation, the catalyst bed 222 attains unusually high temperatures which must be moderated to retain the structure and activity of the regenerating catalyst returned in line 206 and to avoid materials failure in the construction of the regenerator 218 itself.

Appropriate cooling of the catalyst bed 222 can be obtained by heat exchange conduits 224 physically located in the bed 222 and containing an oxidized molten chemical absorbent solution, e.g. alkali metal salts of nitrate and nitrite composition. The molten or liquid state of the chemical absorbent allows for high temperature transfer of heat without failure of the heat exchange surfaces of the heat exchanger 224. The oxidized chemical absorbent at approximately 1200°–1400° F. is removed in line 250 for introduction into a desorption column 252 wherein the high temperature desorbs oxygen from the absorbent for recovery in line 230. This oxygen may be utilized to enrich air feed 232 to the regenerator 218 by combining the oxygen with the air to produce an oxygen enriched air feed 228. An alternative involves heating the molten salt by either catalyst coolers in line 206 or by heat exchange with the flue gas in line 226.

The regenerated molten salt solution from the desorption column 252 is removed in line 255 at a temperature of approximately 1200° F. To render the chemical absorbent receptive to selective absorption of oxygen, it is necessary to reduce the temperature of the absorbent to approximately 900° F. This cooling is performed in a recuperative salt to salt heat exchanger 253 and the steam generator 256 which rejects the heat of the absorbent to boiler feed water introduced in line 260, which boiler feed water is then recovered as process steam in line 258. This process stream may be utilized to power a turbine for the production of power or as a process stream for other duty in the fluidized catalytic cracker unit. Exchanger 253 is connected to the generator 256 by line 254. Steam may be used for catalyst stripping, i.e. line 212.

The cooled chemical absorbent, at a temperature of approximately 900° F., is removed in line 262 and in its cooled and regenerated condition is introduced for staged contact with feed air in a chemical absorption column 240. At that temperature and pressure of the regenerated chemical absorbent, oxygen is selectively absorbed into the nitrite species of the absorbent to oxidize the nitrite to its nitrate state. Oxygen depleted air comprising an enriched nitrogen stream is removed in line 242. This stream 242 can be expanded to recover power if pure nitrogen is produced or combusted to recover power and heat if a considerable oxygen impurity remains in the nitrogen product. The oxidized chemical absorbent from column 240 in line 244 is in the molten liquid state and is efficiently pumped in pump 246 preferably to an elevated pressure in the range of 40 to 100 psia in line 247, whereby it is recycled for high temperature desorption of high pressure chemically bound oxygen. The recuperative heat exchanger 253 prewarms the absorbent in line 247 before passing it in line 248 to the regenerator 218. Alternatively, the pressure in line 244 can be reduced to assist desorption to recover low pressure oxygen, in which case a pump is required in line 255.

Air is introduced into the absorption column 240 in line 238. This air constitutes a portion of the feed air 236 which is compressed to an elevated pressure of approximately 40 psia in air compressor 234. A portion of the pressurized air is utilized for catalyst regeneration in regenerator 218 and the remaining portion is utilized for the separation of oxygen and nitrogen from air as described immediately above. The result of this embodiment of the present invention is to provide an oxygen product which may be used in an integrated manner in a combustion process comprising the regeneration of spent catalyst and a separate nitrogen product, while the high temperature heat previously unutilized at efficient conditions can be used to provide the oxygen product which enriches the regenerator combustion. In addition, the high quality heat utilized for desorption of oxygen from the chemical absorbent can then be rejected at high temperature for use in heating process streams or to produce steam for the generation of power.

Figure 3:
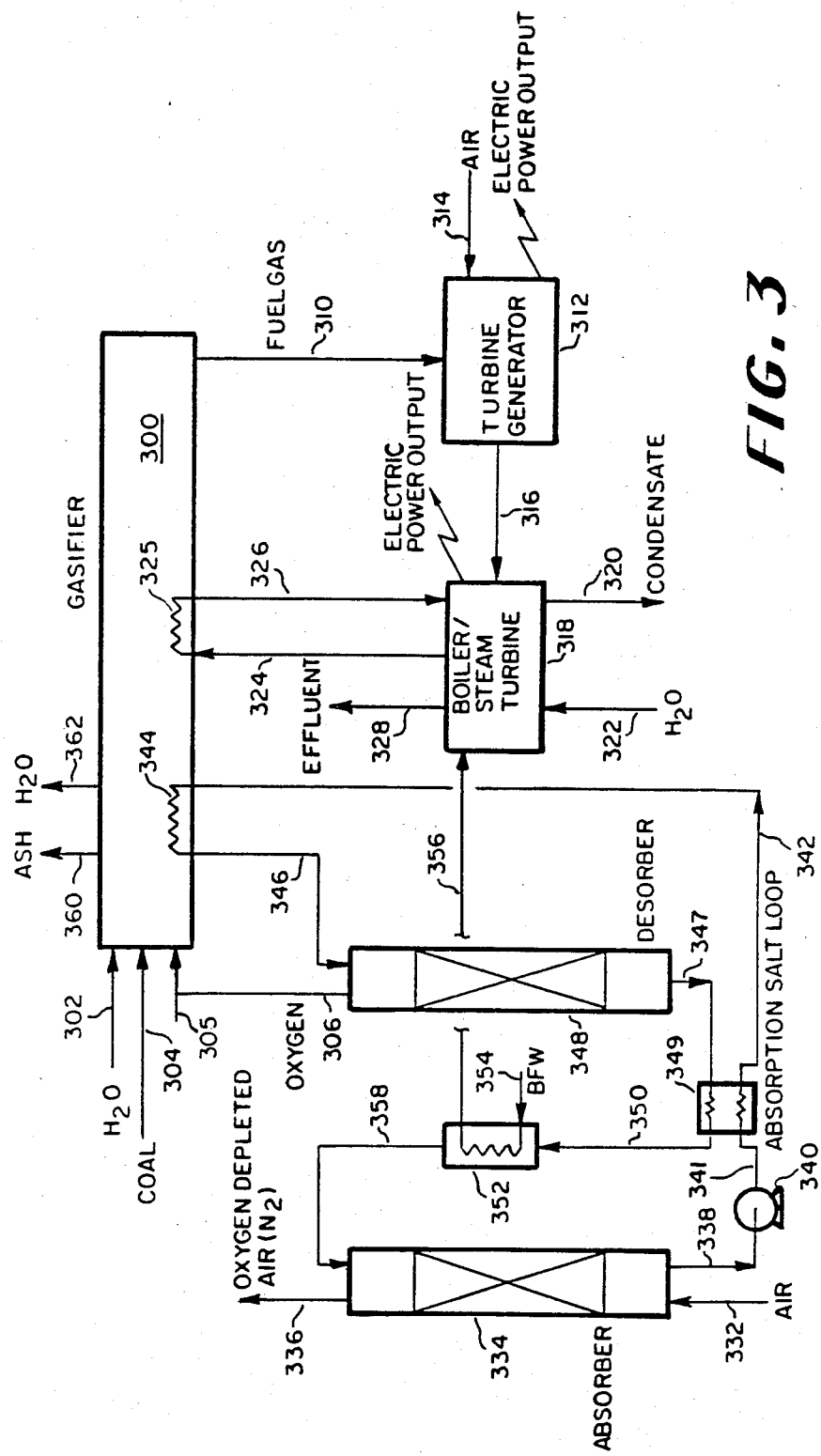
FIG. 3 is an alternative embodiment of the present invention wherein the oxygen separation process is integrated with a coal gasification power generation cycle.

With reference to FIG. 3, another form of the integrated method of the present invention will be disclosed with regard to a coal gasifier utilized to fire a combustion turbine generator and a boiler/steam turbine generator for the production of power. A gasifier 300 is fed with a combination of particulate coal in line 304, a water moderant in line 302 and an oxygen gas oxidant in line 305. The gasifier operates at a temperature above 1300° F.

The gasifier produces a synthesis gas comprising hydrogen, carbon monoxide and carbon dioxide which is used as a fuel stream in line 310. This fuel stream 310 is combusted with air from line 314 in a combustion turbine generator stage 312. The turbine generator is operated by the direct expansion of the combustion effluent through the turbine with resulting production of power, preferably in the form of electric power. A flue gas is removed from the turbine generator in line 316.

Additional steam is produced for the production of power through a turbine in the boiler/steam turbine stage 318. Effectively, boiler feed water 322 is heated in the presence of the flue gas 316 and by the heating of water circulated in line 324 to the downstream portion of the gasifier 300 which is effectively the convective stage of said gasifier. The water in line 324 is converted to saturated steam in heat exchanger 325 and returned in line 326 to the boiler/steam turbine 318. The flue gas is utililzed to produce steam and is then removed in line 328 from the boiler/steam turbine stage 318. The produced steam is passed through a turbine for the production of power, preferably electric power, and residual steam condensate is removed in line 320. Additional steam is provided from the heat exchanger 352 which constitutes a bottoming cycle for the rejection of high quality heat from the absorption salt loop.

To utilize the high quality heat from the radiant and convective section of the gasifier 300 a heat exchanger 344, for the heating of the oxidized liquid chemical absorbent with the sensible heat of the gasifier effluent, is operatively placed in the gasifier 300. This chemical absorbent is heated to a temperature of approximately 1200° F. and removed in line 346 where the absorbent is desorbed of oxygen by the high temperature in desorption column 348. The resulting oxygen gas in line 306 may be utilized as at least a portion of the oxygen feed to the gasifier 300. The regenerated chemical absorbent, free of the predominant amount of oxygen, is removed in line 347 at a temperature of approximately 1200° F. and is cooled to absorption conditions in a recuperative salt to salt heat exchanger 349 and, after passage through line 350, in a feed water heat exchanger 352, which rejects the high temperature heat of the absorbent to boiler feed water in line 354 producing steam in line 356. This steam is then passed to the boiler steam turbine stage 318 to provide additional steam heat for turbine power generation, as recited above.

The chemical absorbent, still in the molten state at a temperature of about 900° F., is introduced into an absorption column 334 in line 358 to contact air in staged absorption zones to selectively absorb oxygen from air and convert the nitrite species of the chemical absorbent to the nitrate species. The air is introduced into the absorption column 334 in line 332, and oxygen depleted air or substantially pure nitrogen is removed in line 336. This oxygen depleted air can be expanded to recover power if it has a high nitrogen purity, used directly as nitrogen product at pressure, or combusted with fuel to utilize its residual oxygen content to produce additional power if it has a substantial oxygen contamination. The selectively absorbed oxygen and the molten solution of chemical absorbent are removed in line 338 and are preferably elevated in pressure through liquid pump 340 to a pressure of approximately 100 psia in line 341. The absorbent is prewarmed in recuperative salt to salt heat exchanger 349. This oxidized chemical absorbent in the liquid phase, then in line 342, is ready for continued cyclic circulation and desorption in the high temperature heat exchanger 344 of the gasifier 300 and the desorber 348, respectively. Alternatively, low pressure oxygen is produced by using increased temperature and decreased pressure to desorb the oxygen from the salt.

The result of the integrated method of FIG. 3 is that high quality heat from the gasifier is again utilized efficiently to produce oxygen by a chemical absorption technique wherein the oxygen may be utilized in the gasifier and the residual heat after producing oxygen can then be rejected, still at reasonably high quality or temperature, for the generation of steam and the production of power which can be combined with the power designed to be produced from the combustion of coal in the gasifier. Again, the unique integration of the air separation process and the combustion process of the gasifier provides an efficient utilization of high quality heat that was previously incapable of efficient utilization, and the rejection of that heat still at relatively high quality or temperature for further duty, particularly the production of power wherein the separated and produced oxygen may be utilized in the combustion process itself further describe unique aspects of the present invention. Potentially a commercially pure nitrogen product is also produced.

Figure 4:
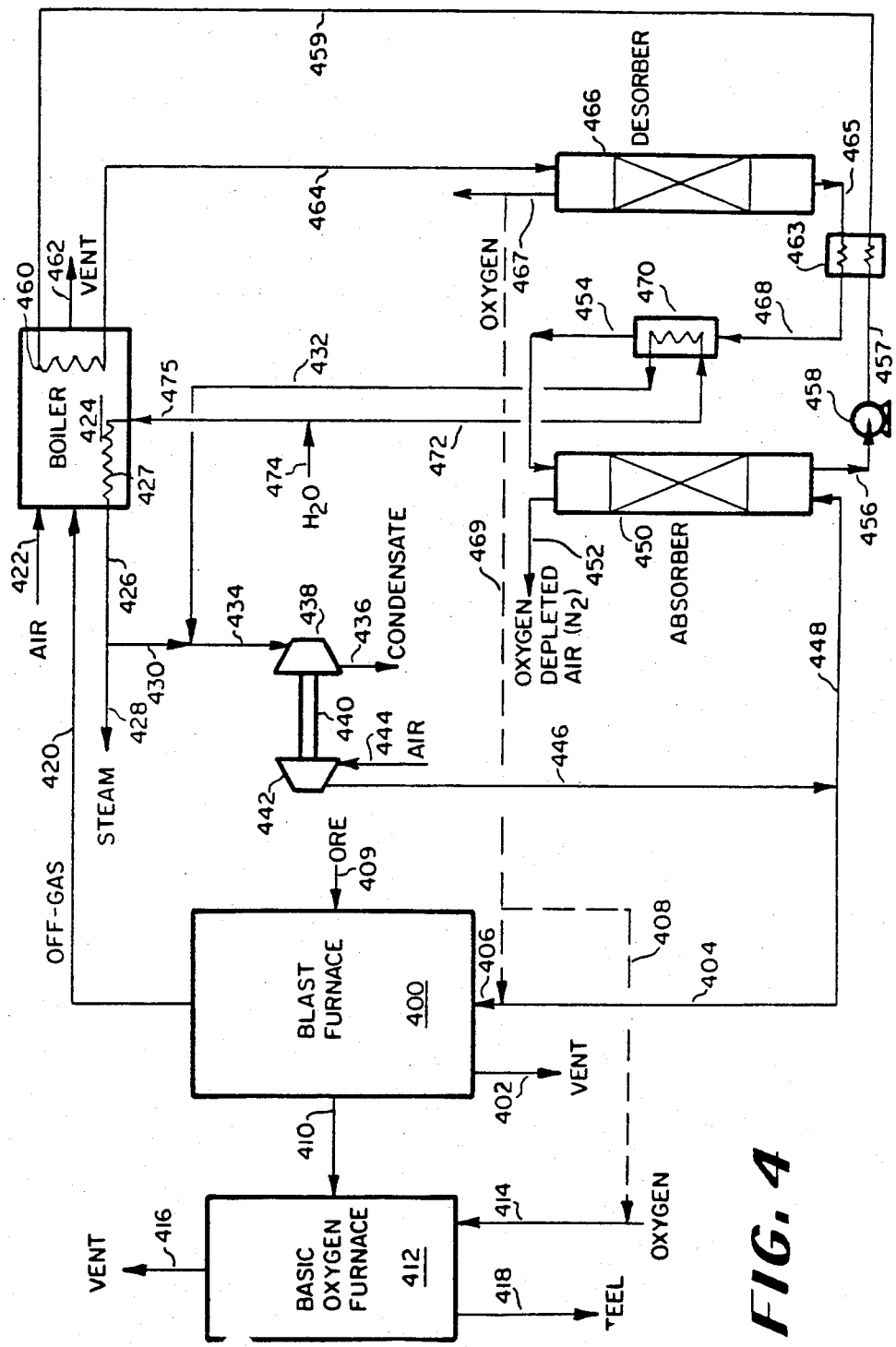
FIG. 4 is another alternative embodiment of the present invention wherein an oxygen separation process is integrated with the steam boiler of a blast furnace and basic oxygen furnace of an iron and steel manufacturing process.

With reference to FIG. 4, an embodiment will be described wherein the chemical absorption process is integrated in a method for operation of a blast furnace and basic oxygen furnace. In a blast furnace 400, air feed in line 444 is compressed in compressor 442 and is introduced by lines 446, 404 and 406 into the furnace 400. Optionally, the air can be enriched with oxygen in line 467 and 469. As traditionally understood, the air or oxygen enriched air is blown through a combustion furnace of iron ore, coke and lime flux to reduce the iron ore to metallic iron. The result is the production of metallic iron 410 from the iron ore introduced into the furnace 400 in line 409. A fuel value off gas is removed in line 420, while a vent stream is removed in line 402.

The metallic or ingot iron can then be upgraded to steel in a basic oxygen furnace 412, which typically blows pure oxygen in line 414 (optionally supplied from line 408) through the molten iron in a bath to burn out carbon impurities and produce a steel product removed in line 418, and vent gases removed in line 416 for possible recovery of fuel values.

The fuel value off gas in line 420 is then combusted with air in line 422 in a boiler combustion zone 424 to produce steam in line 426. The combustion in the boiler 424 also includes a radiant/convective section where high temperature heat is available and a convective section where lower temperature heat is available. The radiant/convective section produces heat which is not efficiently utilized for the production of saturated steam. Therefore, it is appropriate that some of this high quality heat above the 1000° F. temperature is rejected in heat exchanger 460 to a liquid chemical absorbent e.g. molten alkali metal salts of nitrate and nitrite, of the separatory process of the present invention. After utilization of this heat in the boiler combustion zone 424, the residual heat produces the available steam in line 426 from heat exchanger 427. Boiler feed water is introduced into the boiler combustion zone 424 in line 475. Export steam can be removed in line 428, while steam for power is separated out in line 430 and combined with steam produced in the chemical absorption separation cycle, such steam being recovered in line 432. The combined steam streams in line 434 are expanded to recover power in expander 438 and steam condensate is removed in line 436. Preferably, the expander 438 is mechanically linked through appropriate means 440 to the air compressor to the combustion process constituting the blast furnace 400 and to the chemical absorption separation process constituting the absorption salt loop.

A portion of the air 446 compressed in compressor 442 is fed in line 448 to a chemical absorption column 450, wherein it is countercurrently contacted with the liquid chemical absorbent in a staged series of contact zones. Oxygen depleted air, preferably nitrogen, is removed in line 452 and can be utilized directly as a nitrogen product at pressure, expanded, or combusted to recover power if the nitrogen has a significant oxygen content. The oxidized chemical absorbent is removed in line 456 at a temperature of 950° F. and a pressure of 20–70 psia. The liquid oxidized stream is preferably pumped to an elevated pressure through pump 458, such pressure being in the range of approximately 25 psia to 100 psia. The elevated pressure oxidized absorbent is directed in line 457 to the recuperative heat exchanger 63 which preheats the absorbent which is then delivered in line 459 to the boiler combustion zone 424 wherein it passes through a heat exchanger 460 to recover the high quality heat of the combustion end of the boiler combustion zone 424 at a temperature above 1000° F., preferably a temperature of 1350° F. The high temperature absorbent is then removed in line 464 and desorbs oxygen due to the temperature swing in the desorption column 466. The recovered oxygen is removed in line 467 at a temperature of approximately 1200° F. and a pressure of approximately 70 psia. This oxygen may be utilized in the blast furnace 400 or alternatively the oxygen in line 467 may be introduced into the basic oxygen furnace 412 through line 408 and 414. Alternatively, the oxygen can be desorbed by temperature swing with no pressure change or a decrease in pressure from the pressure of absorption to assist in desorption.

The resulting regenerated chemical absorbent is removed from the desorption column 466 in line 465 and is cooled in recuperative heat exchanger 463, passed in line 468 to heat exchanger 470 to further reduce its temperature to return it to a temperature at which absorption can be performed. This cooled chemical absorbent in line 454 is returned for absorption duty in absorption column 450.

Boiler feed water in line 474 is split into a partial feed stream in line 475 to the boiler combustion zone 424 and a remaining boiler feed water stream line 472 which cools the chemical absorbent in heat exchanger 470. The produced steam from heat exchanger 470 is recovered in line 432 and is blended with the steam in line 430 produced by the boiler combustion zone 424. These combined streams, as recited before, are fed in line 434 to an expander 438 to recover power. The residual steam stream in line 428 can be utilized to produce additional quantities of power for the overall process or used as process steam elsewhere.

As a result, the embodiment illustrated in FIG. 4 provides a unique integration of a blast furnace steam boiler and a chemical absorption separation process, wherein air to the blast furnace is compressed and a portion is utilized for the air separation process and the oxygen product of the separatory process may be utilized alternatively either in the blast furnace or the basic oxygen furnace of an iron production facility. Further, it is contemplated in this and other applications that the oxygen can be used in other processes. In addition, the heat exchange between the high temperature heat source of at least 900° F. with the molten salt solution of the oxygen acceptor allows a unique efficiency and freedom in performing the critical heat exchange wherein unlike the prior art heat exchanges, such as steam production, the present heat exchange to desorb oxygen from the molten salt is performed at a presure differential of less than 10 atmospheres. The prior art usually performs such heat exchanges at 20 to 170 atmospheres at similar high temperatures with resulting limitations on heat exchange materials and attendant capital cost requirements.

In all of the embodiments illustrated in the proceeding text, the integration of a chemical absorbent separation of oxygen and nitrogen from air with a combustion process provides the opportunity to utilize the excess temperature availability above 1000° F. and still utilize the heat for steam or process stream heat duty at a lower but still high quality temperature level, while air use, oxygen consumption, or power generation may also be optionally or alternatively integrated into the process depending upon the specific embodiment contemplated. The two heat exchanges to heat and then cool the chemical oxygen absorbent the cascade aspect of the overall sequence of heat exchange of the process.

The present invention has been set forth with regard to several preferred embodiments. However the scope of the present invention should not be limited to these embodiments, but rather should be ascertained from the claims which follow.

We claim:

1. A method for separating oxygen from air by a reversible chemical absorption and desorption at high temperature and the recovery of heat from a combustion process by integrating the air separation in cascade heat exchange with the combustion process to produce oxygen from air and rejecting heat at a temperature of at least 700° F., comprising the steps of:
   (a) compressing air to an elevated temperature and pressure;
   (b) contacting at least a portion of the air, which has been preliminarily cleaned and dried, with a liquid chemical absorbent to chemically absorb at least a portion of the oxygen from said air;
   (c) heating the oxidized liquid chemical absorbent to a temperature of at least 900° F. by heat exchange of the absorbent with a combustion process which is supplied oxygen at a higher concentration than that of air that produces heat at or above 1000° F. to transfer said heat from the combustion process to the absorbent;
   (d) desorbing oxygen from said absorbent utilizing said heat of step (c) to produce an oxygen product and to regenerate the absorbent;
   (e) cooling the regenerated absorbent by heat exchange with a process stream to reject heat from the absorbent at a lower temperature level than the heat exchange of step (c) at a temperature level of at least 700° F. and to produce a high temperature process stream;
   (f) recycling the absorbent for further contact with air, and
   (g) utilizing at least a portion of the oxygen product in the combustion process of step (c).

2. The method of claim 1 wherein a nitrogen product is also produced.

3. The method of claim 1 wherein the compressed air is split into an air stream fed to the combustion process and an air stream fed to the separation process.

4. The method of claim 1 wherein the absorbent of step (c) is heated to a temperature in the range of approximately 1200° F.–1400° F.

5. The method of claim 1 wherein the oxidized liquid chemical absorbent is pumped to an elevated pressure before desorption to produce a resulting high pressure oxygen gas product upon desorption.

6. The method of claim 1 wherein the liquid chemical absorbent of step (b) is preheated in a recuperative heat exchanger against the regenerated absorbent of step (d).

7. A method for oxygen-enriching a fluidized catalytic cracker regenerator and utilizing the heat derived from the regenerator in an air separation to produce oxygen by a reversible chemical absorption and desorption in cascade heat exchange with said regenerator, comprising:
   (a) compressing preliminarily cleaned and dried air to an elevated temperature and pressure;
   (b) contacting the air with a liquid chemical absorbent to chemically absorb at least a portion of the oxygen from said air;
   (c) heating the oxidized liquid chemical absorbent to a temperature of at least 900° F. by heat exchange of the absorbent with the hot regeneration gases from the oxygen-enriched combustion of coke deposited on the catalyst of the fluidized catalytic cracker wherein the regeneration gases produce heat at a temperature of at least 1000° F. and transfer said heat to said absorbent;
   (d) desorbing pressurized oxygen from said absorbent and reducing the absorbent utilizing said heat of step (c) to produce a pressurized oxygen stream and to regenerate the absorbent;
   (e) cooling the regenerated absorbent of step (d) by heat exchange with a process stream to recover heat for the production of steam at a lower temperature level than the heat exchange of step (c) wherein the absorbent rejects heat at a temperature of at least 700° F.;
   (f) recycling the absorbent for further contact with air; and
   (g) introducing at least a portion of the oxygen of step (d) into the regenerator to oxygen-enrich the combustion of coke of step (c).

8. The method of claim 7 wherein the oxidized liquid chemical absorbent is pumped to an elevated pressure before desorption to produce a resulting high pressure oxygen gas product upon desorption.

9. The method of claim 7 wherein the liquid chemical absorbent of step (b) is preheated in a recuperative heat exchanger against the regenerated absorbent of step (d).

10. A method for oxygen-enriching a coal gasifier and utilizing the heat derived from the gasifier in an air separation to produce oxygen by a reversible chemical absorption and desorption in cascade heat exchange with said gasifier, comprising:
   (a) compressing preliminarily cleaned and dried air to an elevated temperature and pressure;

(b) contacting the air with a liquid chemical absorbent to chemically absorb at least a portion of the oxygen from the air;

(c) heating the oxidized liquid chemical absorbent to a temperature of at least 900° F. by heat exchange of the absorbent with the hot gasifier gases from the oxygen-enriched partial combustion of coal in the gasifier wherein the gasifier combustion gases produce heat at a temperature of at least 1000° F. and transfer said heat to said absorbent;

(d) desorbing pressurized oxygen from said absorbent utilizing said heat of step (c) to produce a pressurized oxygen stream and a regenerated absorbent;

(e) cooling the regenerated absorbent by heat exchange with a process stream to recover heat for the production of power from the absorbent at lower temperature level than the heat exchange of step (c) wherein the absorbent rejects heat at a temperature of at least 700° F.;

(f) recycling the absorbent for further contact with air; and (g) utilizing the oxygen product of step (d) in the combustion of step (c).

11. The method of claim 10 wherein the oxidized liquid chemical absorbent is pumped to an elevated pressure before desorption to produce a resulting high pressure oxygen gas product upon desorption.

12. The method of claim 10 wherein the liquid chemical absorbent of step (b) is preheated in a recuperative heat exchanger against the regenerated absorbent of step (d).

13. An integrated method for the separation of oxygen from air by a reversible chemical absorption and desorption at high temperature and pressure and the reduction of iron ore in an oxygen-enriched blast furnace wherein the separation of oxygen is assisted by the cascade heat exchange of the effluent from the combustion of blast furnace off-gas with the absorbent, comprising:

(a) compressing preliminarily cleaned and dried air to an elevated temperature and pressure;

(b) contacting a portion of the air with a liquid chemical absorbent to chemically absorb at least a portion of the oxygen from said air;

(c) heating the oxidized liquid chemical absorbent to a temperature of at least 900° F. by heat exchange of the absorbent with the hot combusted off-gases from the oxygen-enriched blast furnace combustion performed to reduce iron ore to metallic iron wherein the combusted off gases provide heat at a temperature of at least 1000° F. and said heat is transferred to said absorbent;

(d) desorbing pressurized oxygen from said absorbent utilizing said heat of step (c) to produce a pressurized oxygen product and a regenerated absorbent;

(e) cooling the regenerated absorbent of step (d) by heat exchange with a process stream to recover heat for the production of steam at a lower temperature level than the heat exchange of step (c) wherein the absorbent rejects heat at a temperature of at least 700° F.;

(f) recycling the absorbent for further contact with air; and (g) inroducing at least a portion of the oxygen of step (d) into the blast furnace.

14. The method of claim 13 wherein the oxidized liquid chemical absorbent is pumped to an elevated pressure before desorption to produce a resulting high pressure oxygen gas product upon desorption.

15. The method of claim 13 wherein th liquid chemical absorbent of step (b) is preheated in a recuperative heat exchanger against the regenerated absorbent of step (d).

16. The method of claim 1 wherein the materials used in the heat exchange of step (c) are selected from the group comprising ceramics, high nickel alloys of steel, high density fused alumina and zirconia.

17. The method of claim 1 wherein the liquid chemical absorbent is selected from the group of alkali metal nitrate and nitrite mixtures, barium oxide in an alkali metal nitrate, hydroxide or carbonate, sodium peroxide in an alkali metal nitrate, hydroxide or carbonate, or potassium peroxide in an alkali metal nitrate, hydroxide or carbonate.

18. The method of claim 1 wherein the heat exchange of step (c) is performed with a pressure differential between the combustion process and the absorbent less than 10 atmospheres.

19. The method of claim 1 wherein the heat recovered in step (e) is recovered at a temperature range of 700° F. to 1000° F.

20. The method of claim 1 wherein heat and/or power are recovered from the process stream of step (e).

21. The process of claim 17 wherein the predominant portions of the alkali metal is sodium.

22. A method for oxygen-enriching a coal gasifier and utilizing the heat derived from the combustion of fuel gas from the gasifier in an air separation to produce oxygen by a reversible chemical absorption and desorption in cascade heat exchange with the flue gas from the combustion of fuel gas from said gasifier, comprising:

(a) compressing preliminarily cleaned and dried air to an elevated temperature and pressure;

(b) contacting the air with a liquid chemical absorbent to chemically absorb at least a portion of the oxygen from the air;

(c) heating the oxidized liquid chemical absorbent to a temperature of at least 900° F. by heat exchange of the absorbent with the hot gas from the combustion of gasifier gases from the oxygen-enriched partial combustion of coal in the gasifier wherein the gases from the gasifier produce heat at a temperature of at least 1000° F. and transfer said heat to said absorbent;

(d) desorbing oxygen from said absorbent utilizing said heat of step (c) to produce an oxygen stream and a regenerated absorbent;

(e) cooling the regenerated absorbent by heat exchange with a process stream to recover heat for the production of power from the absorbent at lower temperature level than the heat exchange of step (c) wherein the absorbent rejects heat at a temperature of at least 700° F.;

(f) recycling the absorbent for further contact with air; and (g) utilizing the oxygen product of step (d) in the partial combustion of step (c).

23. The method of claim 13 in which a portion of the produced oxygen is used to oxygen-enrich the combustion in a basic oxygen furnace.

* * * * *